(12) United States Patent
Belden

(10) Patent No.: US 9,222,824 B1
(45) Date of Patent: Dec. 29, 2015

(54) SENSOR FOR DETECTING THE CONTACT LOCATION OF A GAS-LIQUID INTERFACE ON A SOLID BODY

(71) Applicant: Jesse L. Belden, Barrington, RI (US)

(72) Inventor: Jesse L. Belden, Barrington, RI (US)

(73) Assignee: The United States of America as represented by the Secretary of the Navy

( * ) Notice: Subject to any disclaimer, the term of this patent is extended or adjusted under 35 U.S.C. 154(b) by 76 days.

(21) Appl. No.: 14/170,788

(22) Filed: Feb. 3, 2014

(51) Int. Cl.
| | |
|---|---|
| *G01N 15/06* | (2006.01) |
| *G06M 7/00* | (2006.01) |
| *H01J 3/14* | (2006.01) |
| *G01F 23/292* | (2006.01) |

(52) U.S. Cl.
CPC .......... *G01F 23/2921* (2013.01); *G01F 23/292* (2013.01)

(58) Field of Classification Search
CPC ........................................................ G02B 6/00
USPC .......... 250/221, 227.11, 227.18, 216, 227.24, 250/227.28, 573–577, 227.14–227.21, 250/227.23–227.25, 357.1, 900–908; 340/601–604; 318/483; 73/29.01, 73/861.41, 290 R, 291, 293, 170.17, 73/170.21; 356/436–442, 445, 900
See application file for complete search history.

(56) References Cited

U.S. PATENT DOCUMENTS

| | | | | |
|---|---|---|---|---|
| 5,313,072 | A * | 5/1994 | Vachss | 250/573 |
| 5,898,183 | A * | 4/1999 | Teder | B60S 1/0822 |
| | | | | 250/227.25 |
| 7,019,321 | B2 * | 3/2006 | Kokuryo et al. | 250/574 |
| 2009/0153846 | A1* | 6/2009 | Gan | G01F 23/292 |
| | | | | 356/133 |
| 2013/0275007 | A1* | 10/2013 | Chen | B60S 1/0833 |
| | | | | 701/49 |

\* cited by examiner

*Primary Examiner* — Pascal M Bui Pho
(74) *Attorney, Agent, or Firm* — James M. Kasischke; Michael P. Stanley

(57) ABSTRACT

A sensor system for determining the position of a gas-liquid interface on a surface includes a light source and photo detectors spaced along the surface and capable of detecting reflections from the light source. The photo detectors are joined to a processor which determines if the detectors have received a reflection when the gas phase of the gas-liquid interface contacts the surface. An optical guide can be provided having the light source and detectors positioned therein. The guide is positioned in the region of the gas-liquid interface. The guide can utilize total internal reflection to distribute light to the detectors where light strikes a gas-guide interface whereas light striking a liquid-guide interface is refracted through the interface.

3 Claims, 4 Drawing Sheets

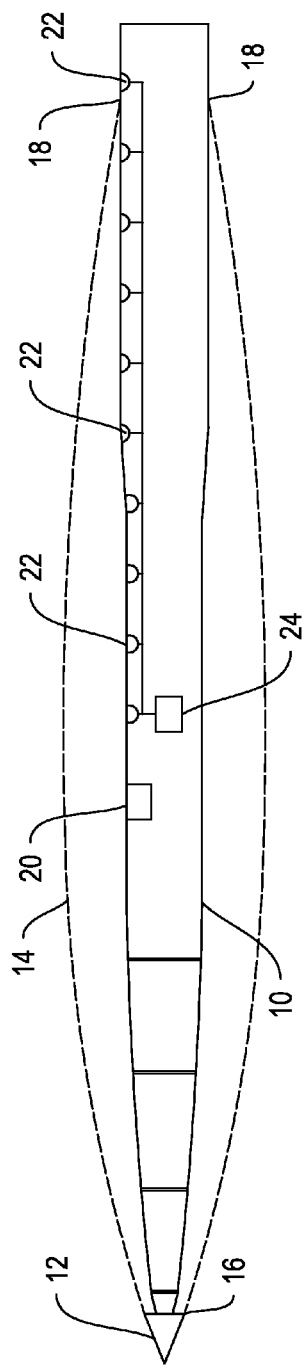
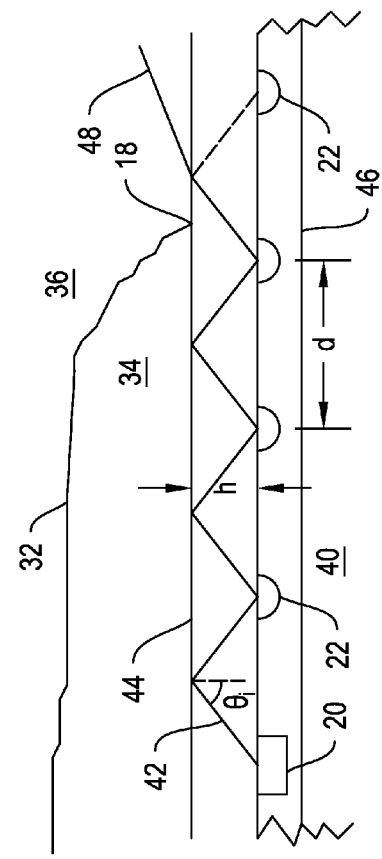
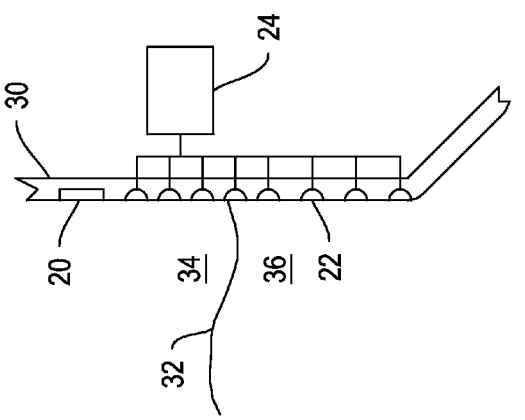

SENSOR FOR DETECTING THE CONTACT LOCATION OF A GAS-LIQUID INTERFACE ON A SOLID BODY

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

None.

BACKGROUND TO THE INVENTION (1) Field of Invention

The invention relates to a sensor system for remotely detecting a gas-liquid interface on a solid body.

(2) Description of the Prior Art

Determining the location of a liquid contact location is a common problem when dealing with gas-liquid interfaces. This problem occurs in determining the level of liquid in a tank, location of a waterline on a vessel or buoy, or positioning of a cavity about a high-speed underwater vehicle.

There is a trade-off between sensor spatial resolution and complexity. A sensor array sized to cover a large area must reduce the overall number of sensors or use a prohibitively complex processing system. For example, pressure sensors are a common method of detecting the presence of either gas or liquid at a single point. Making these measurements over a large area requires an array of sensors which can be tedious to work with and consume large amounts of processing time.

Sensors based on electrical conductance/resistance changes are also known in the art, but are also generally limited to small surface areas, which makes them impractical for large-scale applications such as vessels or structures.

Another type of sensor, an optical sensor, utilizes the principles of total internal reflectance to distinguish a gas-liquid interface. Several prior art patents describe sensors that make use of the principle of total internal reflection for detecting the presence of moisture or dirt on a vehicle windshield (e.g., U.S. Pat. No. 6,052,196 to Pientka et al., U.S. Pat. No. 6,232,603 to Nelson, U.S. Pat. No. 6,084,519 to Coulling et al.). While these sensors typically are incorporated into a feedback control system, they only measure locally and do not provide specific information about the location of contact of gas-liquid interfaces with the surface. Moreover, the sensors are not configured to provide information for a larger area.

It is desireable to have sensors which can accurately determine the location of a gas-liquid interface over a large surface. As previously mentioned, dynamically and remotely detecting the location of a gas supercavity on a supercavitating vehicle is vital for vehicle control and model validation, yet a reliable method of remotely detecting the closure location is lacking. Another application is detecting the location of contact of a free-surface on a ship hull or buoy, critical for vessel control and safety. Finally, application of such a sensor to a floating platform or other marine structure would provide important information on the structure's submergence, preventing it from being raised or lowered beyond safety margins or structural limits.

It is desirable to have a sensor which can monitor a gas-liquid interface and continuously provide feedback over a large area without increasing the need for the number of sensors.

It is further desirable to have a device which has the sensitivity to collect data variations from single point to a large surface area.

It is further desirable to have a device which may utilize such data in a feedback loop to control a cavitator or other object.

SUMMARY OF THE INVENTION

Accordingly, a sensor system for determining the position of a gas-liquid interface on a surface includes a light source and photo detectors spaced along the surface and capable of detecting reflections from the light source. The photo detectors are joined to a processor which determines if the detectors have received a reflection from the gas phase of the gas-liquid interface. An optical guide can be provided having the light source and detectors positioned therein. The guide is positioned in the region of the gas-liquid interface. The guide can utilizes total internal reflection to distribute light to the detectors where light strikes a gas-guide interface whereas light striking a liquid-guide interface is refracted through the interface.

The present invention is intended to be configurable so as to measure the dynamic contact location of a gas-liquid interface either at a local point, along a linear dimension of the body or over a surface area of the body. The signal received from the sensor can be incorporated into a feedback control loop to provide information about the separation, closure and/or cavity about the solid body.

BRIEF DESCRIPTION OF THE DRAWINGS

Reference is made to the accompanying drawings in which are shown an illustrative embodiment of the invention, wherein corresponding reference characters indicate corresponding parts, and wherein:

FIG. 1 shows one embodiment of a sensor for detecting the location of cavity closure on a supercavitating body;

FIG. 2 shows one embodiment of a sensor for detection of a gas-liquid interface location on a ship hull;

FIG. 3 shows an exemplary embodiment of a single source, multi-detector sensor;

DETAILED DESCRIPTION OF INVENTION

Figure 4:
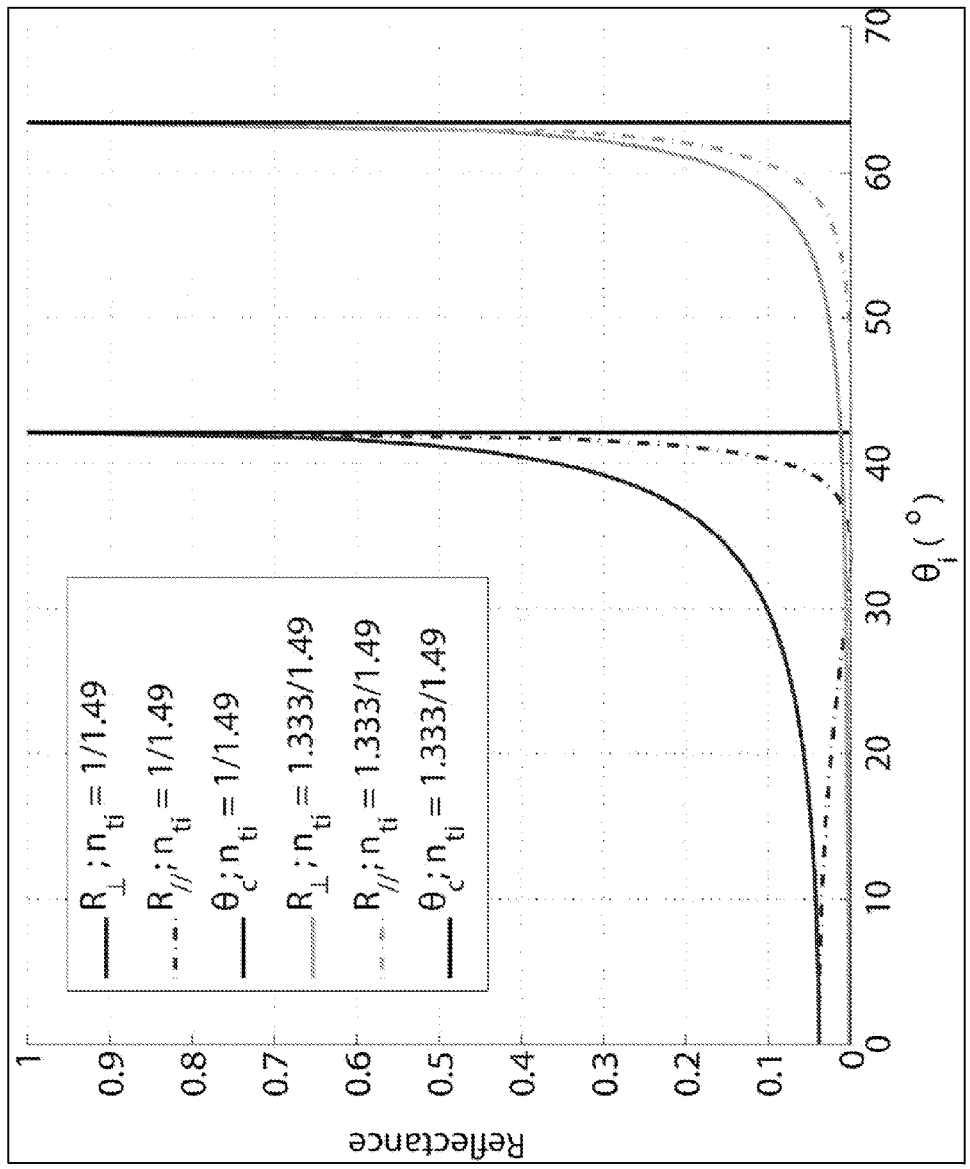
FIG. 4 shows a graph representing reflectance as a function of angle of incidence for sample materials.

For the purpose of promoting an understanding of the present invention, references are made in the text to exemplary embodiments of gas-liquid interface sensors and sensor systems. It should be understood that no limitations on the scope of the invention are intended by describing these exemplary embodiments. One of ordinary skill in the art will readily appreciate that alternate but functionally equivalent sensors and systems may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, the drawings emphasize the principles of the invention. In addition, in the embodiments depicted herein, reference numerals in the various drawings refer to identical or near identical structural elements.

The following terms are used throughout this disclosure. "Feedback control mechanism" refers to a mechanism which utilizes input data to dynamically control a system. "Guide" refers to a three-dimensional structure capable of transmitting and/or directing light. The term "optical component" refers to a component which alters or processes a light beam. Optical components may include, but are not limited to, beam splitters, prism couplers and optical filters. The term "photosensitive component" refers to a component capable of sensing light or other electromagnetic energy. Photosensitive components may include, but are not limited to, photodetectors, photographic plates and particle detectors. As used herein, the term "supercavitating vessel" refers to a vessel which is designed to move through an underwater environment with a gaseous bubble thereabout.

In FIG. 1, there is shown a supercavitating vehicle 10. A cavitator 12 is positioned at the nose of vehicle 10. In use, vehicle 10 generates a cavity 14. Typically cavity 14 is generated by a drop in pressure as the vehicle 10 travels through an underwater environment. Cavity 14 begins at a separation region 16 at the terminal edge of cavitator 12. Cavity 14 extends along vehicle 10 to a closure 18 where the cavity 14 terminates. Closure 18 can be along vehicle 10, as shown here, or behind vehicle 10.

A sensor system is adhered, attached or embedded along the length of a supercavitating vehicle 10. Sensor system detects the location at which the cavity gas-liquid interface or closure 18 contacts vehicle 10. Sensor system includes a light source 20 and a plurality of light sensing elements 22. Light sensing elements 22 are positioned along a surface of vehicle 10 and are joined to a control computer 24 within vehicle 10. Light sensing elements 22 provide a signal to computer 24 indicating whether the surface is locally in contact with a liquid or a gas. Contact with a gas is expected to yield a signal indicating the presence of light from light source 20, and contact with a liquid is expected to yield a signal indicating a lower level of light. Light sensing element 22 signals can be incorporated into a feedback control loop governed by computer 24.

Control computer 24 monitors signals from elements 22. Control computer 24 can be pre-programmed to continuously monitoring the gas-liquid body contact location represented by shifts in element 22 signals. Control computer 24 can determine the gas-liquid body contact location continuously or at any given time by determining the location of the signal transition. By way of specific, non-exclusive examples, this information can be utilized in control computer 24 for modifying control of the cavitator, modifying control of other systems which may affect location of the gas-liquid interface, displaying a continuously updated visual representation of the gas-liquid body contact location on a user interface, or storing the data for later analysis.

FIG. 2 shows another embodiment that relates to detecting the location of contact of a wetted surface. A cross-sectional view of a vessel or buoy hull 30 is shown. A gas-liquid boundary 32 between air 34 and water 36 contacts an intermediate portion of hull 30. A sensor system is joined to hull 30. A light source 20 is positioned in the nominally gas region 34 and light sensing elements 22 extend along the hull 30 crossing the expected location of the gas-liquid boundary 32. Regular spacing of elements 22 is not required as long as the location of each element 22 is known. Elements 22 can be in communication with a computer 24.

One general embodiment of sensor is shown in FIG. 3 where a sensor is positioned on a body 40. The sensor consists of a single light source 20 that provides light 42 at an angle of incidence $\theta_i$ within a guide 44 having a width, length L and thickness h. The thickness may be constant or variable along the length of the sensor. The guide 44 is constructed of a translucent material having an index of refraction $n_s$. A plurality of light detecting units 22 having one or more optical components and one or more photosensitive components are arranged along the length of the sensor at or near the bottom of the guide 44. Detecting elements 22 and electronics can be provided in a backing material 46 that can be attached, adhered or embedded to body 40.

The method of detection of the contact location 18 of the gas-liquid interface 32 involves placement of the sensor on or near the surface of the body 40 such that a non-opaque optical path exists between the sensor and the environment. The sensor material has an index of refraction, $n_s$, that is larger than the indices of refraction of the both the liquid ($n_l$) and the gas ($n_g$). The critical angles associated with the guide-gas interface and guide-liquid interface are given, respectively, as $$\theta_{c_{s-g}} = \sin^{-1}\left(\frac{n_g}{n_s}\right) \tag{1}$$

and $$\theta_{c_{s-l}} = \sin^{-1}\left(\frac{n_l}{n_s}\right). \tag{2}$$

Because the light beam is from light source 20 and contacts guide 44 at an angle of incidence $\theta_i$, light 42 travels within the sensor at the sensor-environment interface such that the incident light makes an angle $\theta_i$ with the surface normal vector. The incident angle $\theta_i$ is set such that $$\theta_{c_{s-g}} < \theta_i < \theta_{c_{s-l}}. \tag{3}$$

Therefore, total internal reflection will be achieved when the environment in contact with the sensor consists of gas 34. When the environment consists of the liquid 36, a portion of light 48 will escape into the liquid 36, producing a measureable change in the amount of light reflected from the sensor-environment interface. Because the sensor incorporates light detecting elements 22, which measure the change in the amount of light reflected, a change in light detected can indicate the presence of a liquid environment.

For the embodiment shown in FIG. 3 the spatial resolution, d, of the sensor is given by $$d = 2h \tan \theta_i. \tag{4}$$

If the light source 20 in the embodiment shown in FIG. 3 consists of a laser with circular beam of radius r, then the minimum allowable guide thickness is given by $$h = \frac{r}{\sin\theta_i}. \tag{5}$$

The smallest achievable spatial resolution is then $$d_{min} = \frac{2r}{\cos\theta_i}. \tag{6}$$

Although to this point the light detecting units have remained generic, any detecting unit will necessarily consume a portion of the light incident upon it. Defining the initial light source power as $P_0$, we can define the power remaining in the beam after contacting the n-th light detecting unit as:

$$P'_n = x \cdot P_{n-1} = x^n \cdot P_0. \quad (7)$$

where x is the fraction of initial power that remains in the beam after contacting the light detecting unit. Assuming a state of total internal reflection at the sensor-environment interface, the power incident upon the $n^{th}$ detecting unit is then $$P''_n = x^{n-1} \cdot P_0. \quad (8)$$

and the power sampled by $n^{th}$ detecting unit is $$P_n = (1-x) \cdot x^{n-1} \cdot P_0. \quad (9)$$

The n-th detecting element must be capable of detecting this power. Furthermore, every detecting unit must be capable of detecting the change in the incident power when the environment in contact with the sensor changes from gas to liquid. Although the light will cease to be totally internally reflected at the location at which the liquid contacts the guide surface, a portion of the light will still be reflected. This portion depends on the angle of incidence and the refractive indices of the guide and the liquid. The reflectance, R, defined as the ratio of reflected power to incident power, is plotted in FIG. 5 for representative refractive indices of $n_s=1.5$, $n_l=1.333$ and $n_g=1$. The solid and dashed black curves correspond to the reflectance in a plane perpendicular and parallel to the plane of incidence for the guide-gas interface, respectively. Similarly, the gray curves correspond to the guide-liquid interface. The vertical black lines denote the critical angle associated with each interface. In order to maximize the sensitivity of the sensor, the incidence angle should be as close as possible to $\theta_{c_{s-g}}$ so that the amount of reflected power when liquid contacts the surface is minimized. Nonetheless, the reflectance increases slowly until an angle very close to the critical angle, thus providing relatively loose design constraints.

The minimum power resolution (i.e., smallest detectable change in power) of the sensor can be defined as $$\Delta P_n = P_n(1-R) = (1-R) \cdot (1-x) \cdot x^{n-1} \cdot P_0. \quad (10)$$

Assuming N is the last sensor that can detect both $P_n$ and $\Delta P_n$, then the length of the sensor can be written as:

$$L = Nd. \quad (11)$$

Figure 5:
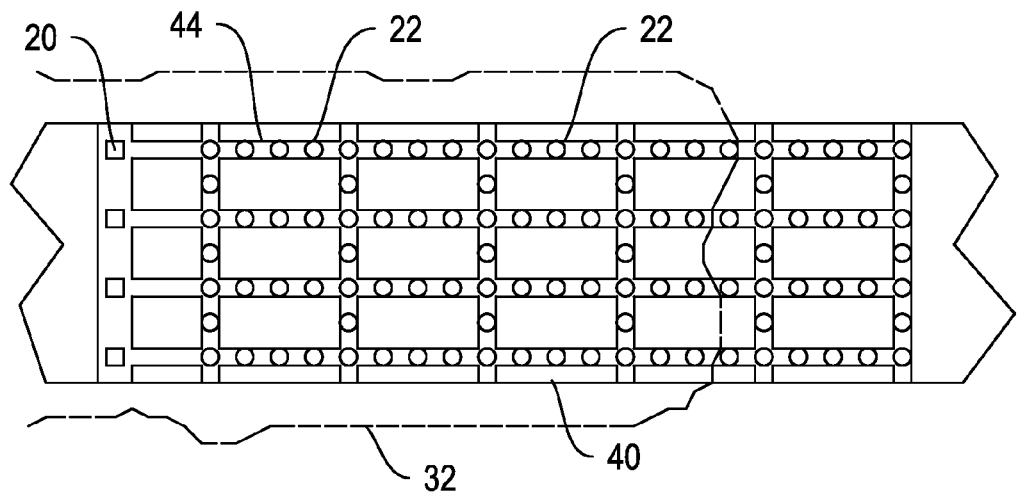
FIG. 5 shows an exemplary embodiment of a sensor for detection of a gas-liquid interface in multiple dimensions.

FIG. 5 depicts another embodiment of the sensor that utilizes a light source 20 with a network of light detectors 22 embodied in guide strips 44 about the body 40 of a vehicle. A cavity 32 is positioned about body 40. Circuitry (not shown) can be positioned beneath sensor or within body 40. This embodiment allows detection of the cavity position longitudinally and radially.

Figure 6:
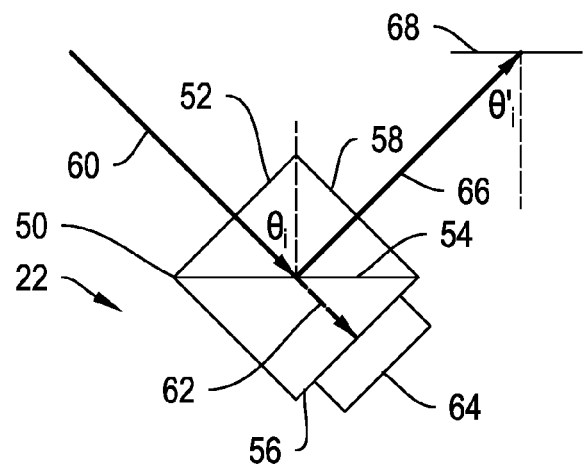
FIG. 6 shows an exemplary embodiment of a light detecting element.

One embodiment of the light detecting unit 22 is shown in FIG. 6. At each light detecting unit 22 location, a beam splitter 50 is incorporated into the bottom of the guide 44. Beam splitter 50 has an incident surface 52, a partially reflective surface 54, a transmission surface 56, and a reflection surface 58. Incident light 60 strikes the incident surface 52 of the beam splitter 50 at an angle of zero degrees to the normal. A portion 62 of the incident light 60 as given in equation (9) is transmitted through the beam splitter 50 to a photo-detector 64 that is positioned on the transmission surface 56 of the beam splitter 50. As given by equation (7), the remainder of the incident light is reflected and directed towards the guide-environment interface 66 such that the angle of incidence that the reflected ray makes with the guide-environment interface 68 is $$\theta'_i = \frac{\pi}{2} - \theta_i. \quad (12)$$

Therefore, the next light detecting element 22 must be arranged at a different angle to ensure the incident surface of the beam splitter is normal to the incoming ray. If the initial incidence angle of the light is set to $$\theta_i = \frac{\pi}{4}, \quad (13)$$

then each light detecting element 22 can be arranged in the same orientation.

Figure 7:
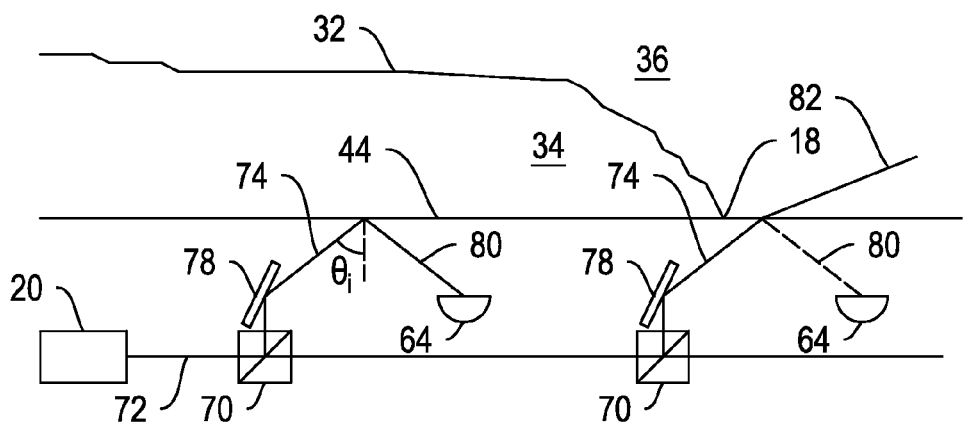
FIG. 7 shows an embodiment of an alternate sensor system.

FIG. 7 shows another embodiment of the light detecting element 22 in which a beam splitter 70 is at or near bottom of the guide 44 away from the detected environment. The exterior of guide 44 is subjected to a gas-liquid interface 32 having a cavity closure 18 with the gaseous phase indicated at 34 and the liquid phase indicated at 36. Light source 20 provides light 72 directed through guide 44 where it contacts a beam splitter 70. Beam splitter 70 splits light 72 into a first portion 74 directed toward guide 44 surface and a second portion 76 for transmission to additional beam splitters 70. If necessary, a mirror 78 can be incorporated in guide 44 for directing first portion 74 of light at the appropriate incident angle $\theta_i$. When the surface of guide 44 illuminated by first portion 74 of light is surrounded by cavity 34, first portion 74 reflects on path 80. Path 80 terminates at photo-detector 64 also positioned at the bottom of the guide 44. The portion of light transmitted at the beam splitter 70 is incident upon another beam splitter 70 fixed somewhere along the length of the sensor. When the first portion illuminates the surface of guide 44 surrounded by a fluid 36, first portion refracts on path 82. This embodiment allows for variable spatial resolution along the length of the sensor, which may be changed depending upon the requirements of its application.

Figure 8:
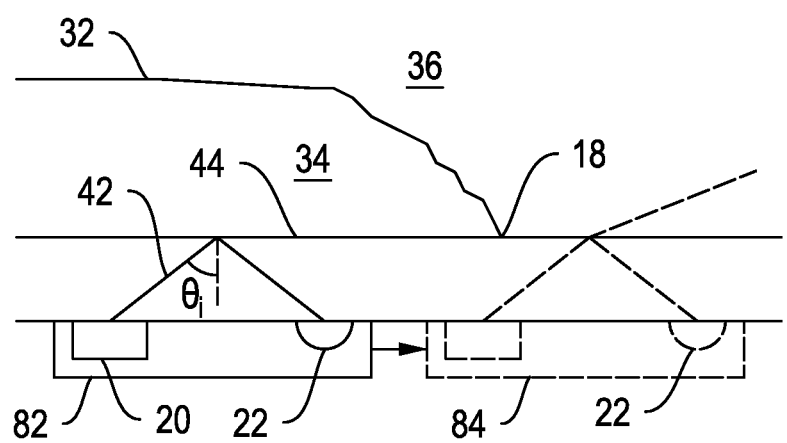
FIG. 8 shows an exemplary embodiment of a single-detector sensor.

An alternative embodiment of the sensor is illustrated in FIG. 8. This embodiment consists of a single light source 20 and light detecting element 22 that is repositionable along the length of the guide 44 from a first position 82 to a second position 84. In first position 82, light 42 reflects from guide 44 to element 22. In second position 84, light 42 transmits through guide 44. Cavity closure 18 can be detected by the lower light level at second position 84. This embodiment provides the sensor with larger dynamic range because the signal is not split and potentially better spatial resolution.

The invention can be practiced other than as described herein. For example, the light source can have a specific frequency of light not ordinarily present in the environment, and the detector can be tuned to receive that specific frequency. This would limit interference from external light.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A sensor system for determining the position of a gas-liquid interface comprising:
   a light source;
   a plurality of photo detectors capable of detecting reflections of light from said light source from the gas-liquid interface and providing a signal responsive thereto, said photo detectors being positioned at known, spaced apart distances from said light source, wherein each photo detector comprises:
   a light detector; and
   a beam splitter joined to said light detector, said beam splitter being positioned to receive reflections of light from the gas-liquid interface, and said beam splitter being capable of splitting the received reflection into an additional reflection toward said gas-liquid interface and a refraction directed toward said light detector; and a processor joined to said plurality of photo detectors to receive the signals therefrom, signals from and positions of said plurality of photo detectors allowing said processor to determine the position of the gas-liquid interface between said light source and one said photo detector.

2. A sensor system for determining the position of a gas-liquid interface comprising:

a light source wherein said light source comprises:
- a light providing a light beam;
- at least one light beam splitter positioned to receive at least a portion of the light beam and to split the beam into a reflected portion and a refracted portion, said refracted portion being provided to others of said at least one light beam splitters; and
- a reflector in optical communication with each at least one light beam splitter for receiving the reflected portion of the light beam, said reflector being capable of directing said reflected portion of the light beam toward the gas-liquid interface;

a plurality of photo detectors capable of detecting reflections of light from said light source from the gas-liquid interface and providing a signal responsive thereto, said photo detectors being positioned at known, spaced apart distances from said light source; and a processor joined to said plurality of photo detectors to receive the signals therefrom, signals from and positions of said plurality of photo detectors allowing said processor to determine the position of the gas-liquid interface between said light source and one said photo detector.

3. A sensor system for determining the position of a gas-liquid interface comprising:

a guide made from a translucent material having a surface positioned in contact with a potential gas-liquid interface, a portion of said guide surface potentially being in contact with a gas of said gas-liquid interface and the remainder of said guide surface potentially being in contact with a liquid of said gas-liquid interface;

a light source in optical communication with said guide;

a plurality of photo detectors in optical communication with said guide, each photo detector being capable of detecting reflections of light from said light source from the gas and guide surface and providing a signal responsive thereto, said photo detectors being positioned at various known distances from said light source wherein each photo detector comprises:

a light detector; and a beam splitter joined to said light detector, said beam splitter being positioned to receive reflections of light from the potential gas and guide surface, and said beam splitter being capable of splitting the received reflection into an additional reflection directed toward said guide surface and a refraction directed toward said light detector; and a processor joined to said plurality of photo detectors to receive the signals therefrom, said processor being capable of determining the position of the gas and guide surface from the received signals and the known position for each detector.

* * * * *